United States Patent
Pande et al.

(12) United States Patent (10) Patent No.: US 7,672,675 B2
(45) Date of Patent: Mar. 2, 2010

(54) SYSTEM OF UTILIZING CELL INFORMATION TO LOCATE A WIRELESS DEVICE

(75) Inventors: Ashutosh Pande, San Jose, CA (US); Lionel Jacques Garin, Palo Alto, CA (US)

(73) Assignee: SiRF Technology Inc., San Jose, CA (US)

( * ) Notice: Subject to any disclaimer, the term of this patent is extended or adjusted under 35 U.S.C. 154(b) by 0 days.

(21) Appl. No.: 10/489,225

(22) PCT Filed: Sep. 10, 2002

(86) PCT No.: PCT/US02/28823

§ 371 (c)(1),
(2), (4) Date: Mar. 9, 2004

(87) PCT Pub. No.: WO03/024131

PCT Pub. Date: Mar. 20, 2003

(65) Prior Publication Data

US 2004/0180670 A1 Sep. 16, 2004

Related U.S. Application Data

(60) Provisional application No. 60/318,806, filed on Sep. 10, 2001.

(51) Int. Cl.
*H04W 24/00* (2009.01)

(52) U.S. Cl. ............... 455/456.1; 342/357.1; 455/456.5; 455/456.6

(58) Field of Classification Search ............. 455/456.1, 455/456.2, 456.5, 456.6, 457
See application file for complete search history.

(56) References Cited

U.S. PATENT DOCUMENTS

| | | | |
|---|---|---|---|
| 6,307,504 B1 * | 10/2001 | Sheynblat | 342/357.06 |
| 6,393,294 B1 * | 5/2002 | Perez-Breva et al. | 455/456.5 |
| 6,433,735 B1 * | 8/2002 | Bloebaum et al. | 342/357.1 |
| 6,449,486 B1 * | 9/2002 | Rao | 455/456.1 |
| 6,757,544 B2 * | 6/2004 | Rangarajan et al. | 455/456.1 |
| 2001/0014604 A1 * | 8/2001 | Kingdon et al. | 455/427 |
| 2003/0148774 A1 * | 8/2003 | Naghian et al. | 455/456 |

* cited by examiner

*Primary Examiner*—Erika A Gary
(74) *Attorney, Agent, or Firm*—RatnerPrestia

(57) ABSTRACT

A system is described that utilizes the measured characteristics of a cell site or a plurality of cell sites (100, 102, 104) and the cellular identification to selectively provide a wireless device (118) with location aiding from a cellular network server (120). The system may include a basestation (106, 108, 110) located within the cell site, a cellular measurement unit located in the wireless device (118), and a database (214) containing positional assistance information corresponding to the characteristic information. The system may also include a processing unit in signal communication with the basestation and the database (214) and a positional determination unit in the wireless device (118).

45 Claims, 11 Drawing Sheets

SYSTEM OF UTILIZING CELL INFORMATION TO LOCATE A WIRELESS DEVICE

CROSS-REFERENCE TO RELATED APPLICATIONS

This application claims the benefit of Provisional Patent Application Ser. No. 60/318,806, filed on Sept. 10, 2001, and entitled "Method and System Of Sending Cell ID With User Location," which is herein incorporated by reference.

BACKGROUND OF THE INVENTION

1. Field of the Invention

This invention relates generally to Satellite Positioning Systems ("SPS") devices, and in particular to a wireless cellular device capable of utilizing cell information with the SPS derived data to locate a wireless cellular device.

2. Related Art

The worldwide utilization of wireless devices such as two-way radios, portable televisions, personal communication system ("PCS"), personal digital assistants ("PDAs") cellular telephones (also known a "mobile phones"), Bluetooth, satellite radio receivers and Satellite Positioning Systems ("SPS") such as Global Positioning Systems ("GPS"), also known as NAVSTAR, is growing at a rapid pace. As the number of people employing wireless devices increases, the number of features offered by wireless service providers also increases, as does the integration of these wireless devices in other products.

The number of features offered by wireless service providers is increasingly matching the features offered by traditional land-line telephone service providers. Features such as call waiting, call forwarding, caller identification ("caller I.D."), three-way calling, data transmission and others are commonly offered by both land-line and wireless service providers. These features generally operate in the same manner on both wireless devices and land-line telephones. "Enhanced 911" (also known as E911) services, however, operate differently on wireless devices than a 911 service call (normally referred to as a "911" call) does on land-line telephones.

When a 911 call is placed from a land-line telephone, the 911 reception center receives the call and determines the origin of the call. In case the caller fails, or forgets, to identify his or her location, the 911 reception center is able to obtain the location from which the call was made from the land-line telephone switching network and send emergency personnel to the location of the call.

If instead, an E911 call is placed from a wireless device such as a cellular telephone, the E911 reception center receives the call but cannot determine the origin of the call. If the caller fails, or forgets, to identify his or her location, the E911 reception center is unable to obtain the location of the call because the mobile switching network is different than the land-line telephone switching network. At present, the best that the E911 reception center may possibly do is determine the location of the basestation corresponding to the cell from which the call was placed. Unfortunately, typical cells in a cellular network system may cover an area with approximately a 30 mile diameter.

However, the United States Congress, through the Federal Communications Commission (FCC), has enacted a requirement that cellular telephones be locatable to within 50 feet once an emergency call, such as an E911, is placed by a given cellular telephone. This type of position data would assist police, paramedics, and other law enforcement and public service personnel, as well as other agencies that may need to have legal rights to determine the position of specific cellular telephone. Therefore, there is a need for a system that determines the location of a wireless device within 50 feet once an emergency call such as an E911 is placed by a given wireless device such as a cellular telephone.

Further, SPS data tat is supplied to the mobile telephone may be utilized by the mobile telephone user for directions, location of other locations that the mobile telephone user is attempting to locate, determination of relative location of the mobile telephone user to other landmarks, directions for the mobile telephone user via internet maps or other SFS mapping techniques, etc. Such data may be utilized for other applications in addition to the E911 service, and would be very useful for cellular and PCS subscribers.

A proposed solution to this problem has been to utilize a wireless positioning system that includes satellites and/or pseudolites (such as basestations) to triangulate the position of a wireless device such as a cellular telephone. GPS is an example of a SPS that may be utilized by a wireless device in combination with an appropriate GPS receiver to pinpoint the location of the wireless device on earth. The array of GPS satellites transmits highly accurate, time coded information that permits a receiver to calculate its exact location in terms of latitude and longitude on earth as well as the altitude above sea level. The GPS system is designed to provide a base navigation system with accuracy to within 100 meters for non-military use and greater precision for the military (with Selective Availability ON).

The space segment of the GPS system is a constellation of satellites orbiting above the earth that contain transmitters, which send highly accurate timing information to GPS receivers on earth. The fully implemented GPS system consists of 21 main operational satellites plus three active spare satellites. These satellites are arranged in six orbits, each orbit containing three or four satellites. The orbital planes form a 55° angle with the equator. The satellites orbit at a height of 10,898 nautical miles (20,200 kilometers) above earth with orbital periods for each satellite of approximately 12 hours.

Each of the orbiting satellites contains four highly accurate atomic clocks. These provide precision timing pulses used to generate a unique binary code (also known as a pseudo random or pseudo noise "PN" code) that is transmitted to earth. The PN code identifies the specific satellite in the constellation. The satellite also transmits a set of digitally coded ephemeris data that completely defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the exact position of the satellite above the earth at any given time. A ground control station updates the ephemeris data of the satellite once per day to ensure accuracy.

A GPS receiver configured in a wireless device is designed to pick up signals from three, four, or more satellites simultaneously. The GPS receiver decodes the information and, utilizing the time and ephemeris data, calculates the approximate position of the wireless device. The GPS receiver contains a floating-point processor that performs the necessary calculations and may output a decimal display of latitude and longitude as well as altitude on the handset. Readings from three satellites are necessary for latitude and longitude information. A fourth satellite reading is required in order to compute altitude.

These techniques, however, still do not perform well in dense environments where the location of a wireless device (such as a cellular telephone) is usually hindered in dense environments such as downtown city blocks. A SPS system within the wireless device should have the capability to acquire and track the SPS satellites under the conditions that the typical user of a wireless device will encounter. Some of these conditions include utilization of the wireless device indoors and in dense urban areas that have a limited sky view, such as in downtown areas with skyscrapers blocking the views of the normally available satellites, etc. While these environments are typically manageable for terrestrial-based wireless communications systems, they are difficult environments for a SPS system to operate. For example, traditional "autonomous mode" SPS systems (i.e., SPS systems where the SPS receiver acquires the signals from the SPS satellites, tracks the satellites, and, if desired, performs navigation without any outside information being delivered to the SPS system) have problems with long Time To First Fix ("TTFF") times and, additionally, have a limited ability to acquire the SPS satellite signals under indoor or limited sky-view conditions.

Even with some additional information, TTFF times may be over thirty seconds because the ephemeris data must be acquired from the SPS system itself, and the SPS receiver typically needs a strong signal to acquire the ephemeris data reliably. These characteristics of a SPS system typically impact the reliability of position availability and power consumption in wireless devices. Typically, the accuracy of location-based solutions may vary from 150 meter to 300 meter in these types of environments. As a result, locating a wireless device in a 300 meter radius zone is unlikely unless there are other methods to help narrow the search.

Attempts at solving this problem have included utilizing pseudolites (such as basestations in a cellular telephone network) in combination with SPS, such as GPS, to determine the location of the wireless device. As an example, U.S. Pat. No. 5,874,914, entitled "GPS Receiver Utilizing a Communication Link," issued to Norman F. Krasner on Feb. 23, 1999, which is herein incorporated by reference, describes a method where a basestation (also known as the Mobile Telephone Switching Office "MTSO") transmits SPS satellite information, including Doppler information, to a remote unit utilizing a cellular data link, and computing pseudoranges to the in-view satellites without receiving or utilizing satellite ephemeris information.

Additionally, U.S. Pat. No. 6,208,290, entitled "GPS Receiver Utilizing a Communication Link," issued to Norman F. Krasner on Mar. 27, 2001, which is herein incorporated by reference, describes a method for deriving the approximate location of SFS receiver from a cellular communication system information source. The actual surveyed latitude and longitude of the cell site is then utilized to compute the approximate Doppler. This may cause errors (especially altitude) since many cellular towers (associated with cellular basestations) are positioned at raised grounds for better coverage and if their altitude is provided for aiding then there may be an error in the location computation.

Unfortunately, these types of combined pseudolite and SPS approaches typically require that the wireless device is always receiving aiding information from the cellular communication system even in non-dense environments where the wireless device may easily determine its position via SPS alone. This results in inefficient power consumption and even slower acquisition times when SPS data is easily obtainable. Also, the aiding information is based on the position of a cell tower (i.e., basestation) that may cause errors as described above. Therefore, there is a need for a system that determines the location of a wireless device within 50 feet in a dense environment with selective aiding from non-SPS pseudolites.

SUMMARY

A system for determining the approximate position (i.e., the location) of a wireless device, located within a cell of a cellular telephone network, utilizing a satellite position system. The system may include a basestation located within the cell, the basestation transmitting a broadcast signal to the wireless device, a cellular measurement unit located in the wireless device, the cellular measurement unit capable of measuring characteristic information of the cell, and a database containing positional assistance information corresponding to the characteristic information. The system may also include a processing unit in signal communication with the basestation and the database, the processing unit capable obtaining position assistance information from the database in response to the basestation receiving the characteristic information from the wireless device, and a positional determination unit in the wireless device, the positional determination unit capable of determining the position of the wireless device based on the utilization of the satellite position system and the positional assistance information.

The method preformed by the system may include transmitting to the wireless device a cellular identification of the cell, or a plurality of cells, and receiving characteristic information of the cell, or plurality of cells, from the wireless device. Additionally, the method may include obtaining positional assistance information from a database, the positional assistance information corresponding to the received characteristic information and transmitting the positional assistance information to the wireless device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following Figures. The components in the Figures are not necessarily to scale, emphasis instead being placed upon illustrating the principles of the invention. Moreover, in the Figures, like reference numerals designate corresponding parts throughout the different views.

DETAILED DESCRIPTION

A system is described that utilizes the measured characteristics of a cell site and cellular identification to selectively provide approximate location of a wireless device as well as provide a wireless device with location aiding from a cellular network server. The system sends the positional information of a wireless device that is tagged with the cellular identification information to a database. The database relates the positional information of wireless device with the cellular identification information and then the database is typically only tapped for information when another wireless device only transmits the cellular identification. As a result, the database may be updated with positional and cellular identification information to cover areas where the wireless device might 'roam' into another service provider's network and not have access to the database of the new service provider. If the home network has a database that is developed over time by storing location data received from its customers, the database will be able to provide approximate location of a wireless device as well as provide location aid information to wireless device even when in roam mode. Additionally, the service provider may be able to create a database of their service area in order to model the real world coverage layout of their network, identify dead zones and enhance their coverage area.

Figure 1:
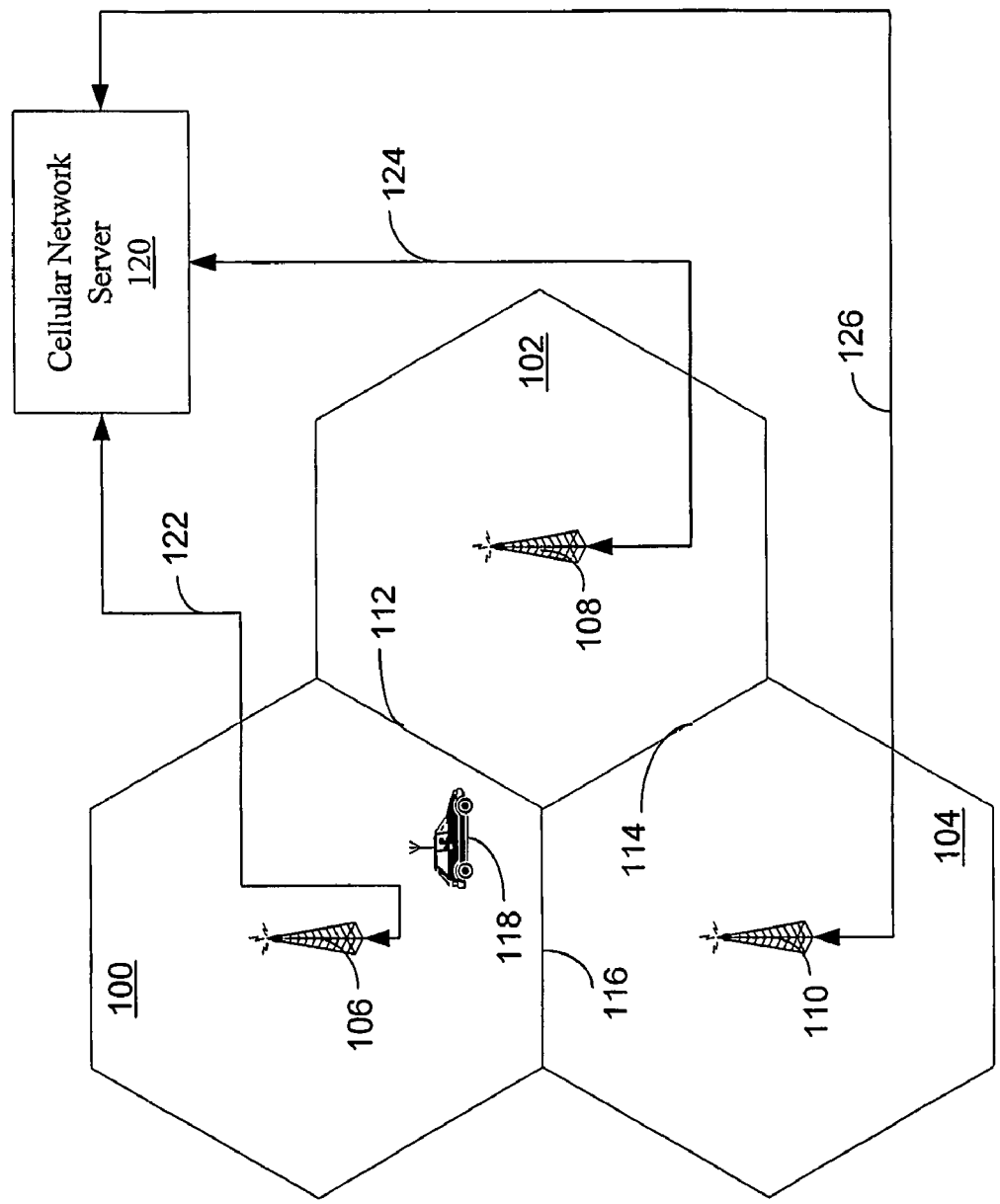
FIG. 1 is a graphical representation of three cell sites within a cluster of cells of a cellular telephone network.

Referring to the drawings and initially to FIG. 1, a plurality of cells 100, 102 and 104 in a cellular telephone network (known as the "cellular network") are shown. Consistent with convention, each cell 100, 102 and 104 is shown having a hexagonal cell boundary. Within each cell 100, 102 and 104 are basestations 106, 108 and 110 that are located near the center and/or centroid of the corresponding cell 100, 102 and 104. Specifically, the basestation 106 is located within cell 100, basestation 108 is located within cell 102 and basestation 110 is located within cell 104.

The boundaries 112, 114 and 116 separating the cells 100, 102 and 104 generally represent the points where handoff occurs between the cells. As an example, when a wireless device 118 (also known as a "mobile unit") moves away from basestation 106 towards an adjacent basestation 108, the signal-to-interference plus noise ratio ("S/I+N") from the basestation 106 will drop below a predetermined threshold level past the boundary 112 while, at the same time, the S/I+N from the second basestation 108 increases above this predetermined threshold as the wireless device 118 crosses the boundary 112 into cell 108. Cellular systems are designed to provide coverage from each basestation up until the cell boundary. In addition, wireless devices are designed to receive signals from various base stations and capable of initiating a handoff if the signal level of one station is stronger than the one currently being used for communication. This is part of the Mobile Assisted Hand Over (MAHO) function in a mobile device.

Each cell 100, 102 and 104 basestation 106, 108 and 110 is in signal communication with a cellular network server 120, via signal paths 122, 124 and 126, respectively. The cellular network server 120 is generally a switching network server that may include telecommunication switches (not shown) and a central office (not shown). The cellular network server 120 controls the operation of the basestations 106, 108 and 110 and may assign individual cellular identification values to the basestations 106, 108 and 110 corresponding to the identification values for cells 100, 102 and 104.

These identification values may then be transmitted via a two-way channel or a broadcast channel to individual wireless devices (such as wireless device 118) located in the cellular network and utilized for identifying the location of the wireless device 118 relative to a specific cell. As an example, when basestation 106 broadcasts a cellular identification value (also known as a "cellular tag") for cell 100, wireless device 118 would receive the broadcast signal and respond to basestation 106 identifying itself as wireless device 118 located within the coverage area of cell 100. This identification may take place at any time when the wireless device 118 and basestation 106 are communicating such as in the initial cellular handshake procedure or at a later time. Utilizing this approach, the cellular identification values may be utilized as approximate location aids for the wireless device 118.

As another example, when basestations 106, 108, 110 broadcast their cellular identification value (also known as a "cellular tag") for cell 100, 102 and 104, wireless device 118 would receive the broadcast signals. These signals are sent through the basestation 106 (through which it is communicating) identifying itself as wireless device 118 located within the coverage area of cell 100, also receiving cells 102 and 104. This identification may take place at any time when the wireless device 118 and basestation 106 are communicating such as in the initial cellular handshake procedure or at a later time. These cellular identification values are stored in a database and later utilized as approximate location aids for the wireless device 118.

Figure 2:
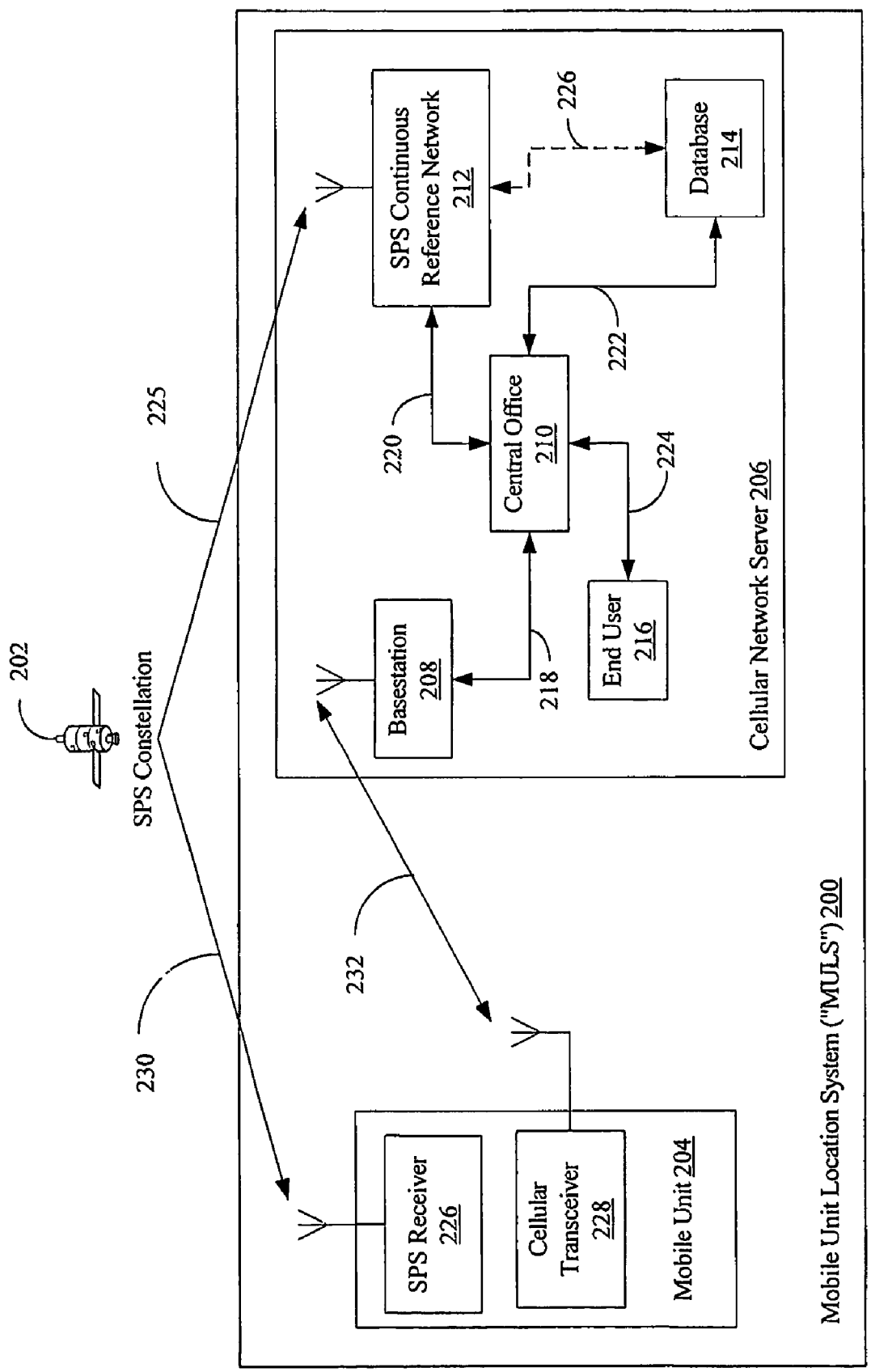
FIG. 2 is a block diagram illustrating an example implementation of a mobile unit location system ("MULS") in accordance with the invention.

In FIG. 2, a block diagram illustrating an example implementation of a mobile unit location system ("MULS") 200 is shown receiving SPS signals from a SPS constellation 202. The MULS 200 may include a mobile unit (i.e., a wireless device) 204 and cellular network server 206. The cellular network server 206 may include a basestation 208, central office 210, SPS Continuous reference network 212, database 214 and end user 216. The basestation 20S may also be optionally independent of the cellular network server 206. The central office 210 is in signal communication with the basestation 208, SPS continuous reference network 212, database 214 and end user 216 via signal paths 218, 220, 222 and 224, respectively. Additionally, the SPS continuous reference network 212 may be optionally in signal communication with the database 214 via optional signal path 226.

The basestation 208 is a fixed device such as a cellular tower and the associated equipment that the mobile unit 204 communicates to in order to communicate to a landline telephone network (whether private or public) such as the plain old telephone service ("POTS"). The central office 210 (also known as a "public exchange") is generally a facility where lines of a subscriber are joined to switching equipment for connecting with other subscribers whether locally or long distance. The SPS continuous reference network 212 is a fixed device and the associated equipment to receive SPS signals from the SPS constellation 202 via signal path 225. The database 214 is a database located in a memory unit (not shown) that stores location information of the mobile unit 204 with the associated characteristic information of a cell including the cellular identification of the cell. The end user 216 may be any end user such as a program, application, utility, subsystem or actual individual that desires the location information of the mobile unit 204 including a user of the mobile unit.

The mobile unit 204 may include a SPS receiver 227 and a cellular transceiver 228. The SPS receiver 227 receives SPS signal from the SPS constellation 202 via signal path 230 and the cellular transceiver 228 is in signal communication with the basestation 208 via signal path 232. Examples of the SPS receiver 227 include SiRFstarI, SiRFstarII and SiRFstarIII GPS receiver produced by SiRF Technology, Inc. of San Jose, Calif., GPSOne GPS receiver produced by Qualcomm Incorporated of San Diego, Calif., or any other GPS receiver capable of operation within the mobile unit 204. The cellular transceiver 228 (also known as "call processing modem") may be any radio frequency ("RF"), Amps, FDMA, TDMA, GSM, CDMA, W-CDMA, CDMA-2000 or UMTS type transceiver.

Figure 3:
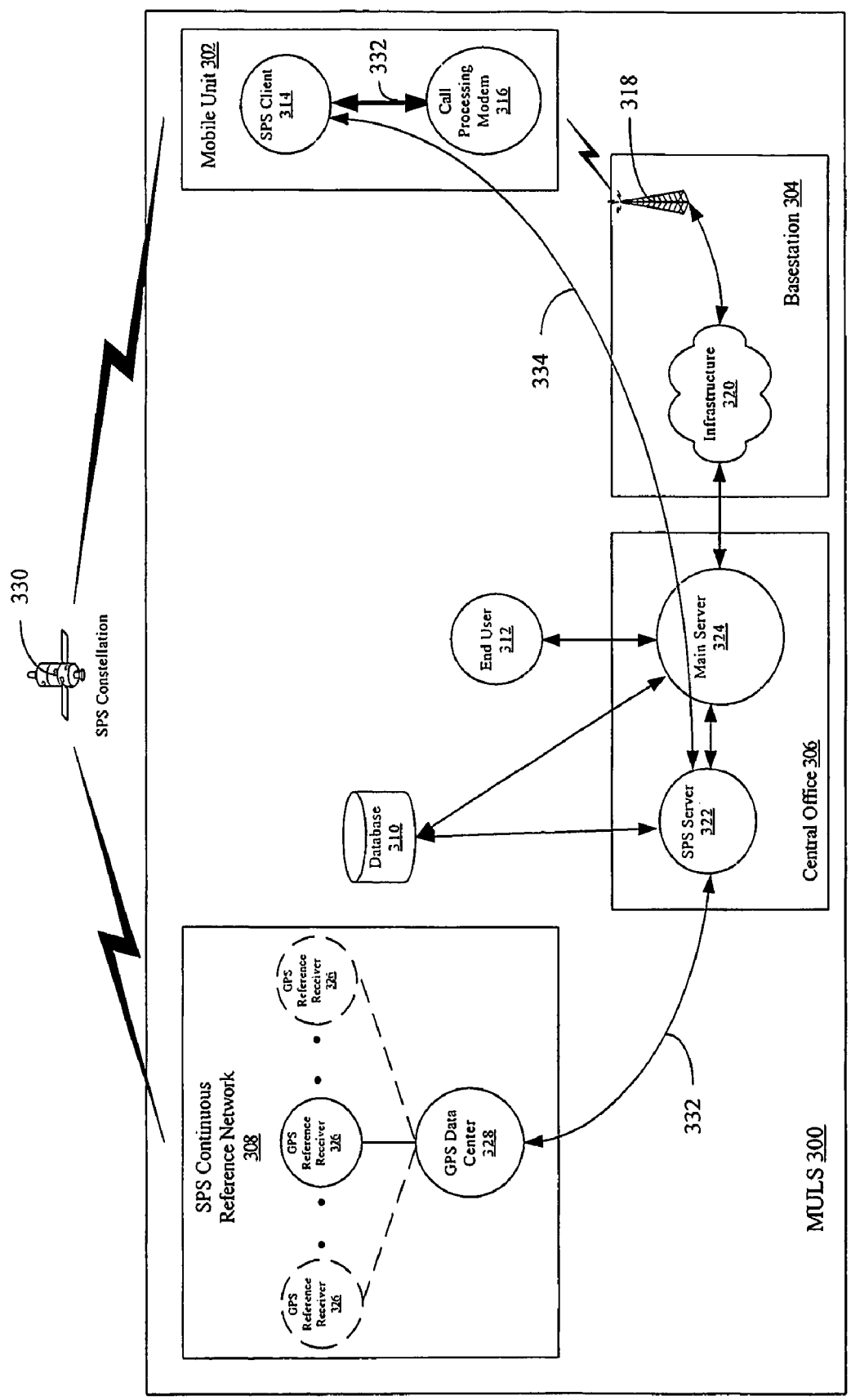
FIG. 3 is a block diagram illustrating a simplified example implementation of the MULS of FIG. 2 in a typical cellular telephone environment.

In FIG. 3, a block diagram illustrating a simplified example implementation of the MULS 300 in a typical cellular telephone environment is shown. The MULS 300 includes a mobile unit 302, a basestation 304, central office 306, SPS continuous reference network 308, database 310 and end user 312. The mobile unit 302 may include a SPS client 314 such as a SiRFLoc client and a call processing modem 316 such as a RF, Amps, FDMA, TDMA, GSM, CDMA, W-CDMA, CDMA-2000 or UMTS type transceiver. The basestation 304 includes the fixed device such as radio tower 318 and the associated infrastructure 320. The central office 306 includes a SPS server 322 such as SiRFLoc server and a main server 324. As an example this could be the Serving Mobile Location Center(SMLC)/Global Mobile Location Center(GMLC) as defined in the wireless location standard for GSM. The main server 324 is the main switching components and electronics of the central office 306. The SPS continuous reference network 308 includes a SPS reference receiver 326 and a SPS data center 328. The SPS continuous reference network 308 and the mobile unit 302 both receive SPS signals from the SPS constellation 330.

As an example of operation, the SPS continuous reference network 308 collects data, from the SPS constellation 330 in the system coverage area, in real-time and stores collected data locally in a memory unit (not shown) within the SPS continuous reference network 308. Based on the coverage area, multiple reference receivers 326 may be used in the system. Periodically, the SPS server 322 polls, via signal path 332, the data from the SPS continuous reference network 308 related to the SPS client 314, and caches it in its internal memory unit (not shown) in the SPS server 322, so that it may be reused for another SPS client (not shown) without polling it again if it is relevant to subsequent SPS clients (not shown). This information is then transmitted to the SPS client 314 via signal path 334, which is the signal path through the central office 306, basestation 304 and call processing modem 316.

It is appreciated that the combining of cellular identification information with the mobile unit 302 location may take place either within the SPS subsystem (i.e., the SPS client) 314 or within the call processing modem 316 or even in the SPS server 322. In the one example, the cellular identification information is transferred from the call processing modem 316 to the SPS client 314 and tagged to the computed position (i.e., latitude, longitude and altitude data). In another example, the location from the SPS client 314 is sent to the call processing modem 316 where it is tagged to the cellular identification information. This tagged data is then sent as a message, over the wireless network, to database 310 where it is stored. In a third example, the location from the SPS client 314 and the cellular identification information are received as different messages from the same SPS client 314 during the same geolocation session, and associated together at the SPS server 322.

The MULS 300 allows the mobile unit 302 be more accurately and quickly located by providing additional surrounding information (i.e., an approximate location aid) from the database 310. As a result of providing this approximate location aid, a SPS receiver may be jump-started to provide position information for the mobile unit 302 in an acceptable timeframe. Knowing the approximate location of the mobile unit 302 also helps the mobile unit 302 expedite its location calculations.

When a mobile unit wants acquisition assistance from the cellular network server, specifically from a roaming network, the mobile unit receives the cellular identification from the network and sends this cellular identification to the mobile unit's home network. A query is then made in the database for the received cellular identification and (assuming the data is in the database) the approximate location coordinates for the mobile unit is sent back as a response. The approximate location coordinates are derived based on statistical processing of the location data (i.e., latitude, longitude, altitude) in the database developed over multiple sessions from a plurality of mobile units. This information is utilized to generate the location aid as well as other aiding packets (such as ephemeris etc.).

Figure 4:
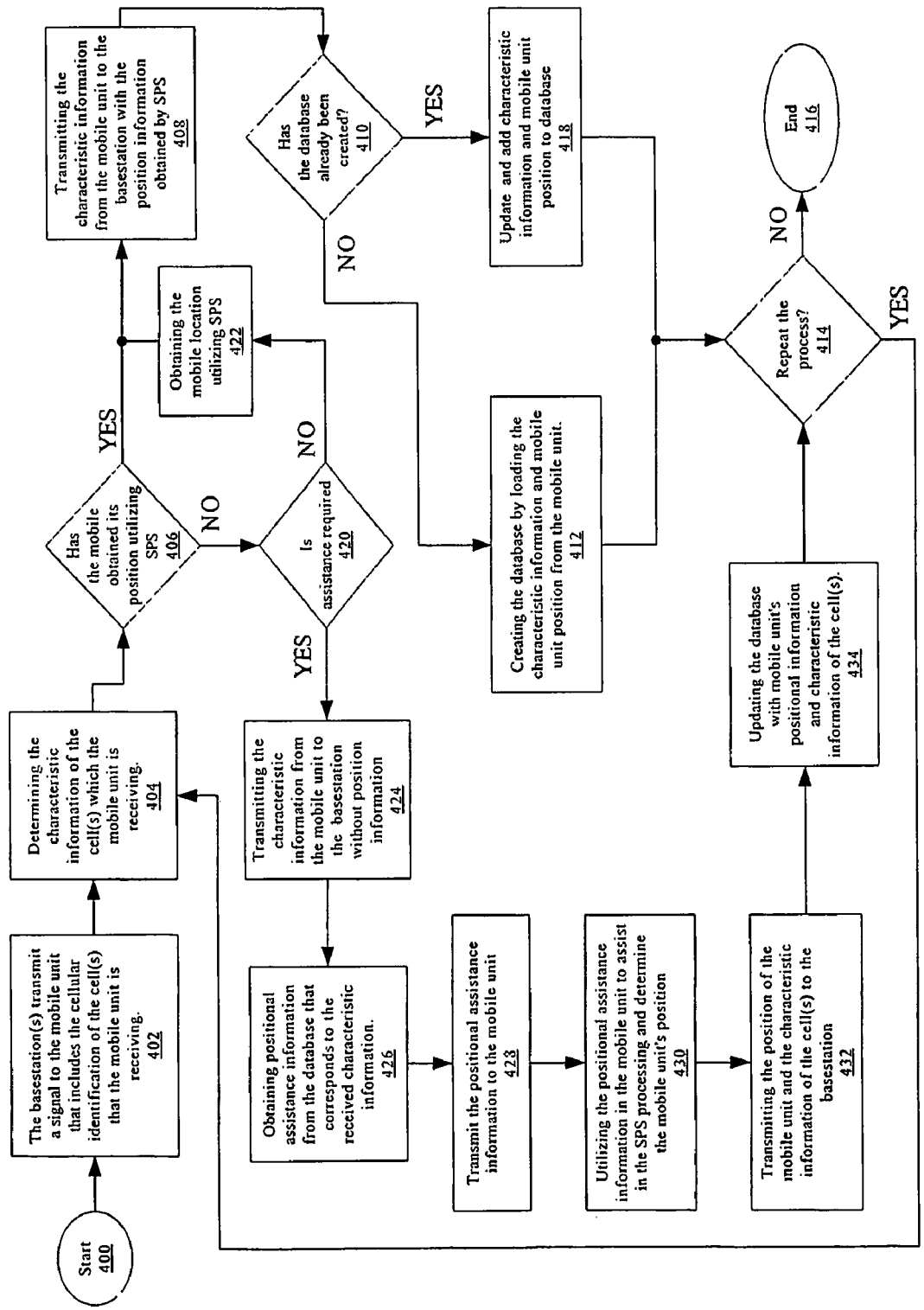
FIG. 4 is a flowchart illustrating an example process performed by the implementation of the MULS in FIG. 3.

In FIG. 4, a flowchart illustrating the example process performed by MULS 300 of FIG. 3 is shown. The process begins 400, with the basestation or a plurality of base stations transmitting a signal that includes the cellular identification information of the cell the mobile unit is in step 402. The mobile unit receives the signal from the basestation and determines the characteristic information of the cell or cells in step 404. The characteristic information may include the signal strength, bit error rate ("BER"), propagation delay and/or the multi-path of the signals transmitted by the basestation to the mobile unit as measured by the mobile unit at the position of the mobile unit within the cell. The characteristic information may also include the number of fingers in a rake receiver and their relative delays and phases. Alternatively, it is appreciated by those skilled in the art that the mobile unit may, instead, determine the characteristic information of the cell first and then receive the signal from the basestation.

If the mobile unit has a SPS receiver and has utilized the SPS receiver to determine its position in latitude, longitude and altitude, the process in step 406 continues to step 408. In step 408, the mobile unit transmits to the basestation the characteristic information of the cell(s) along with its determined position attached to the received cellular identification information. If the database, located at the cellular network server, containing a library of characteristic information, cellular identification information and mobile unit position (i.e., position data) is empty of measurement values 410, the central office loads the received values of the characteristic information, cellular identification information and the position data into the database in step 412. If the mobile unit stops operating and does not transmit 414 any more information to the basestation the process ends 416. If, instead, the mobile unit or another mobile unit (independent of the first mobile unit) continues to operate the process repeats in step 404. It is appreciated that the basestation(s) may continuously transmit the broadcast signal including the cellular identification information.

If the database is not empty of measurement values 410, the central office updates and adds the additional characteristic information, cellular identification information and positional data from the mobile unit to the database in step 418. Again, if the mobile unit stops operating and does not transmit 414 any more information to the basestation the process ends 416. If, instead, the mobile unit or another mobile unit (independent of the first mobile unit) continues to operate the process may repeat in step 404.

If the mobile has not utilized the SPS receiver to determine its position in latitude, longitude and altitude, the process in step 406 continues to step 420. In step 420, the MULS determines if the mobile unit needs assistance from the cellular network server to determine its position. If the mobile unit does not need assistance the mobile unit is instructed to determine its position with its SPS receiver in step 422 and the process continues through steps 408, 410, 412, 418, 414, 416 and 404.

If the mobile unit does need assistance from the cellular network server in step 420, the mobile unit transmits to the central office (through the basestation) the characteristic information and cellular identification without any positional data in step 424. In response, the central office sends a query to the database that includes the characteristic information and cellular identification and in response receives from the database an estimate of the position of the mobile unit that corresponds to the characteristic information and cellular identification in step 426. This estimate of position may be referred to as "positional assistance information." The positional assistance information is then transmitted to the mobile unit in step 428 and the mobile unit utilizes the received positional information to assist in its SPS processing. The mobile unit determines its position in step 430 and transmits its position with the measured characteristic information and cellular identification information in step 432. The central office then receives the information from the mobile unit in step 434 and in response updates the database with the position of the mobile unit and the measured characteristic information and cellular information that corresponds to the position. Again, if the mobile unit stops operating and does not transmit 414 any more information to the basestation the process ends 416. If, instead, the mobile unit or another mobile unit (independent of the first mobile unit) continues to operate the process may repeat in step 404.

Figure 5:
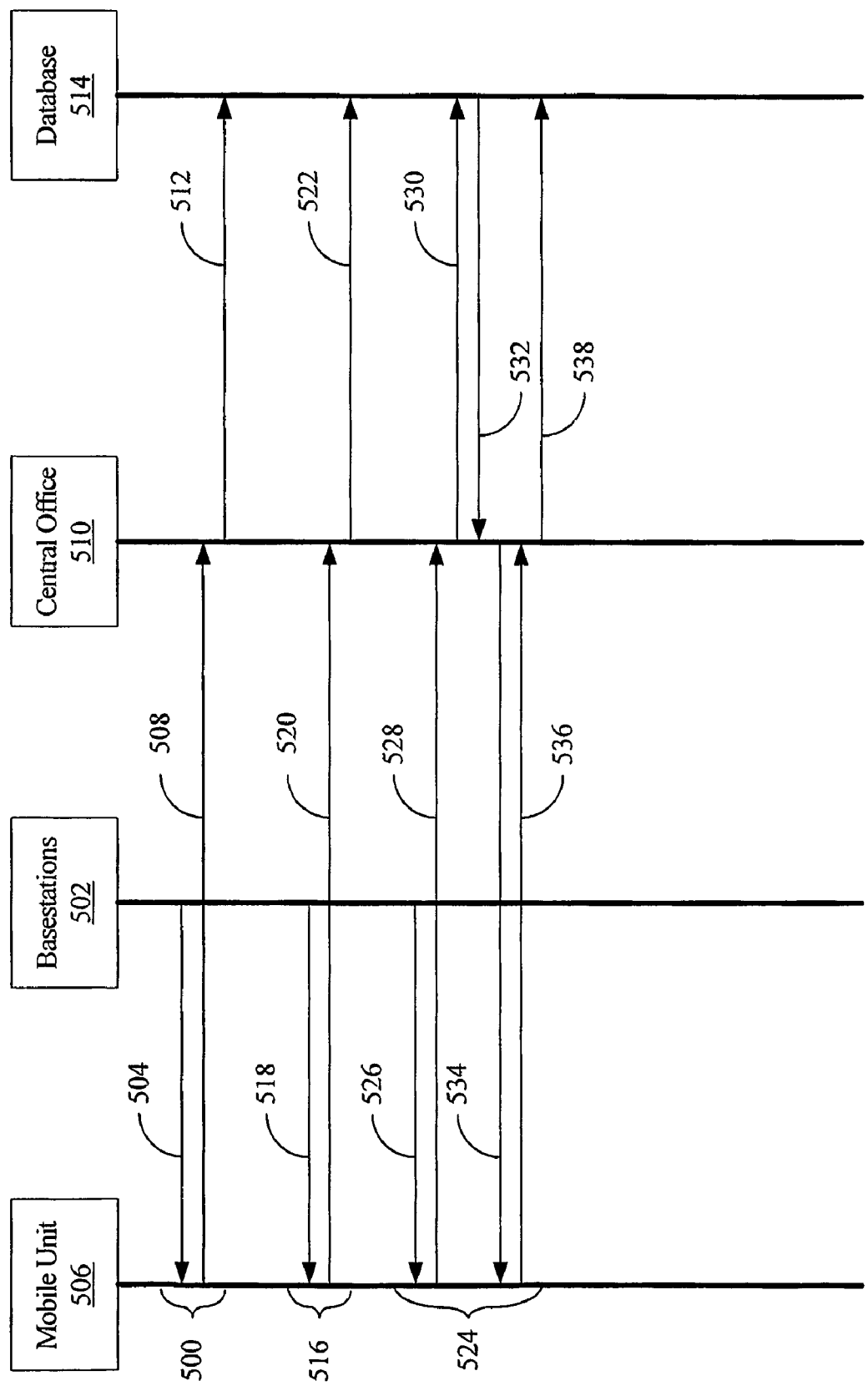
FIG. 5 is a signal flow diagram of the example process described in FIG. 4.

FIG. 5 is a flow diagram illustrating the example process described in FIG. 4. As an example of a first session 500, the basestation or basestations 502 transmits a signal 504 containing the cell identification information to mobile unit 506. In response, the mobile unit 506 first measures the characteristic information of the cell and determines its position with a SPS receiver and then transmits 508 the cellular identification information, characteristic information and its position to the central office 510 via the one of basestations 502. The central office 510 then initializes (i.e., creates) 512 the database 514.

As example of a subsequent session 516 that may either involve the original mobile unit of the first session 500 or a second mobile unit, the basestation(s) 502 transmits a signal 518 containing the cell identification information to mobile unit 506. In response, the mobile unit 506 first measures the characteristic information of the cell(s) and determines its position with a SPS receiver and then transmits 520 the cellular identification information, characteristic information and its position to the central office 510 via one of basestation(s) 502. The central office 510 then updates and adds 522 the new measured characteristic information, mobile unit 506 position and cellular identification information to the database 514.

As another example of a subsequent session 524 that may again either involve the original mobile unit of the first session 500, the mobile unit of the session 516 or a third mobile unit, the basestation(s) 502 transmits a signal 526 containing the cell identification information to mobile unit 506. In response, the mobile unit 506 first measures the characteristic information of the cell and attempts to determine its position wit a SPS receiver but fails to determine its position because the mobile unit 506 is located within a dense environment. As a result the mobile unit 506 transmits 528 the cellular identification information and characteristic information of the cell but not its position to the central office 510 via the basestation 502. The central office 510 then queries 530 the database 514 with the measured characteristic information and cellular identification information. The database responds 532 to the central office with positional assistance information that includes the estimated positional value from the database that corresponds to the values of the measured characteristic information and cellular identification information. The central office 510 sends 534 the positional assistance information to the mobile unit 506 and the mobile unit 506 utilizes the received positional assistance information to obtain its position with the SPS receiver and may again measure the characteristic information of the cell. The mobile unit 506 then transmits 536 the cellular identification information, characteristic information and its position to the central office 510 via the basestation 502. The central office 510 then updates and adds 538 the new measured characteristic information, mobile unit 506 position and cellular identification information to the database 514.

Figure 6:
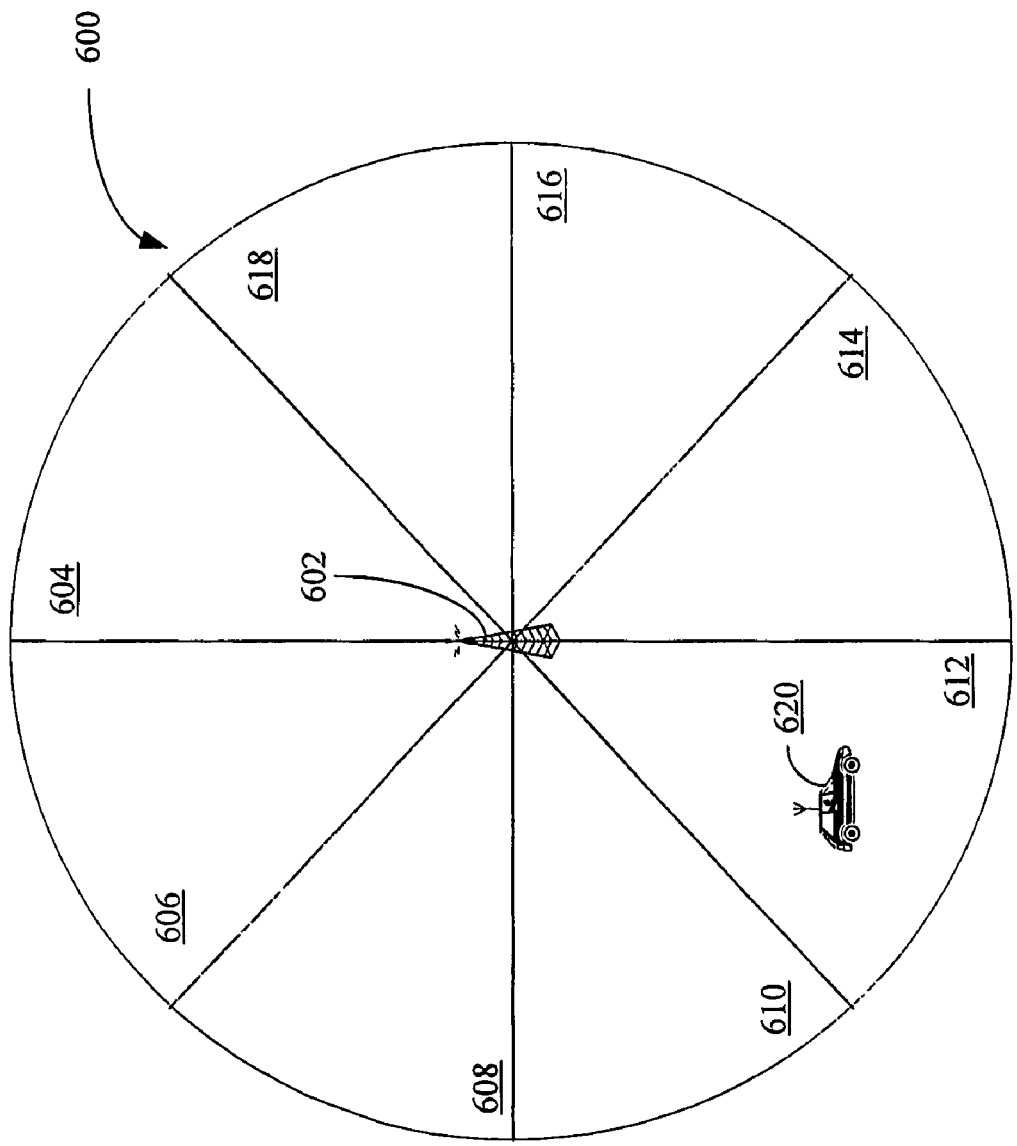
FIG. 6 is a graphical representation of an example cell site having an ideal circular footprint coverage pattern.
Figure 7:
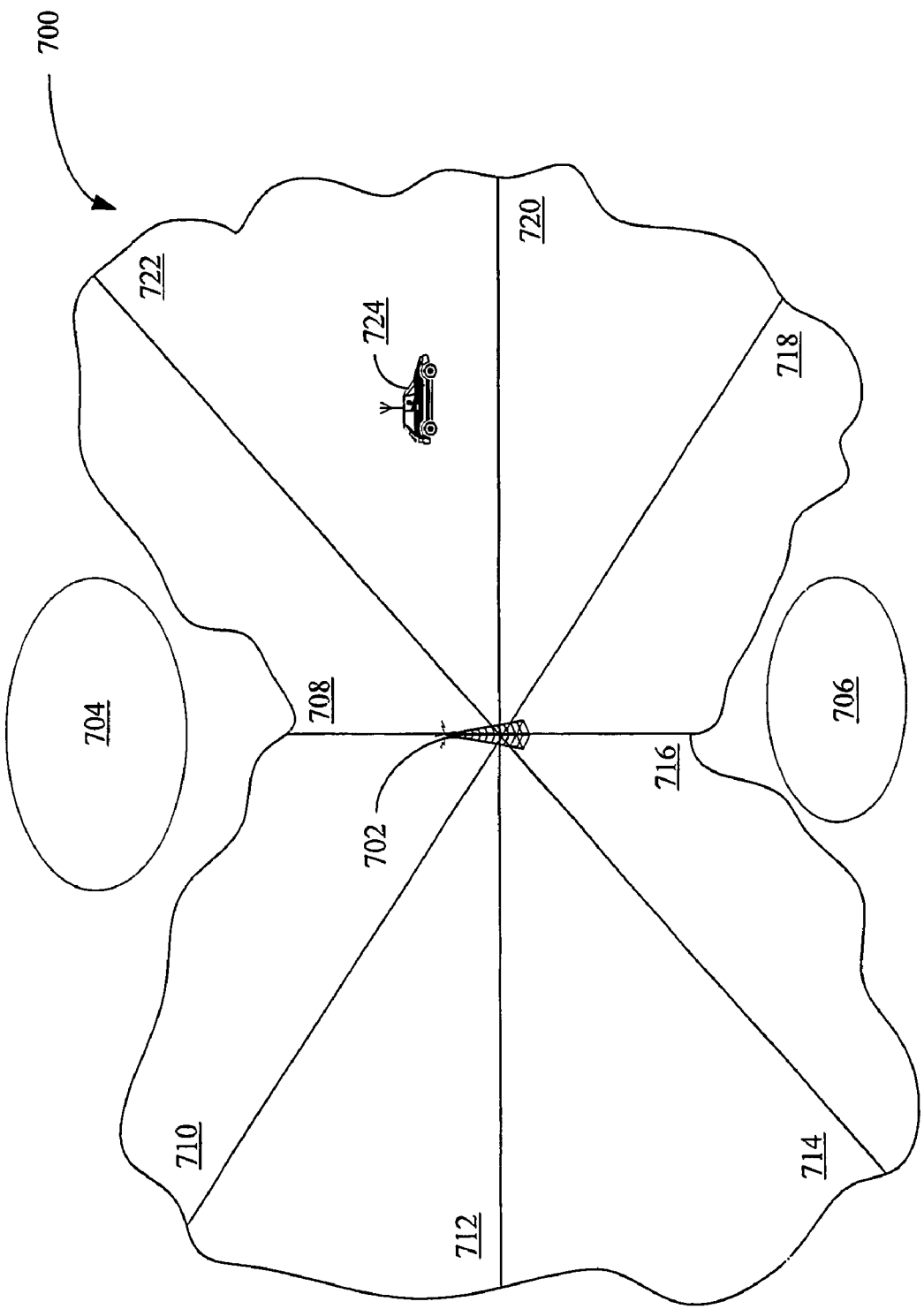
FIG. 7 is a graphical representation of an example cell site having a non-ideal circular footprint coverage pattern located between a pair of obstructions.
Figure 8:
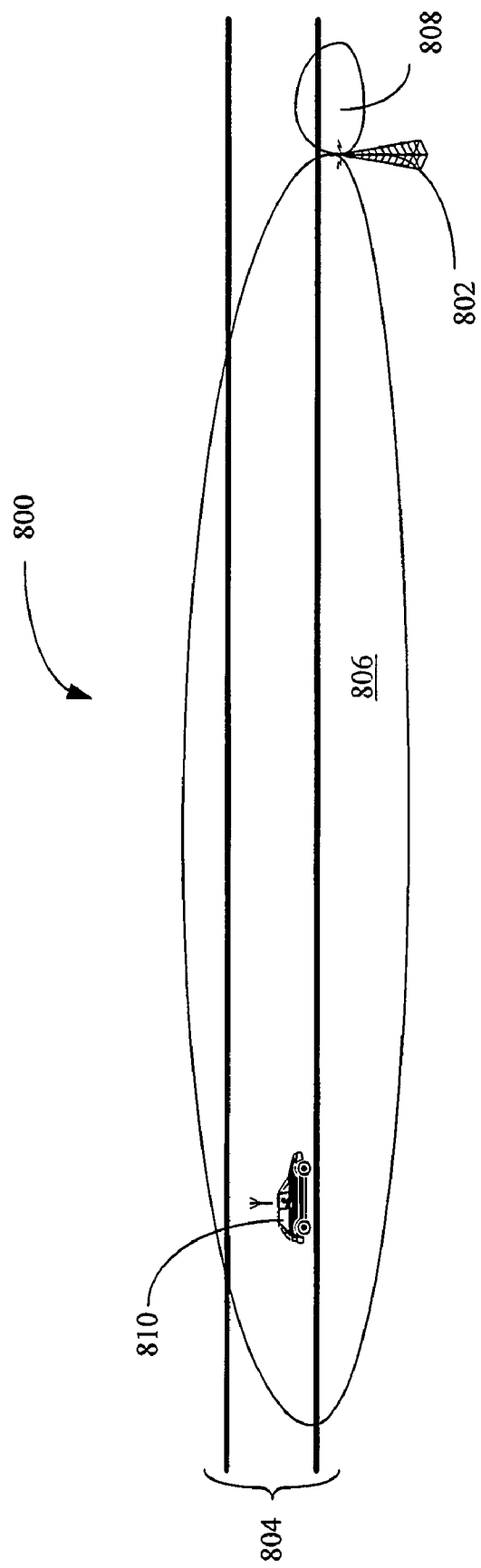
FIG. 8 is a graphical representation of an example cell site having a non-ideal circular footprint coverage pattern located along an example highway.
Figure 9:
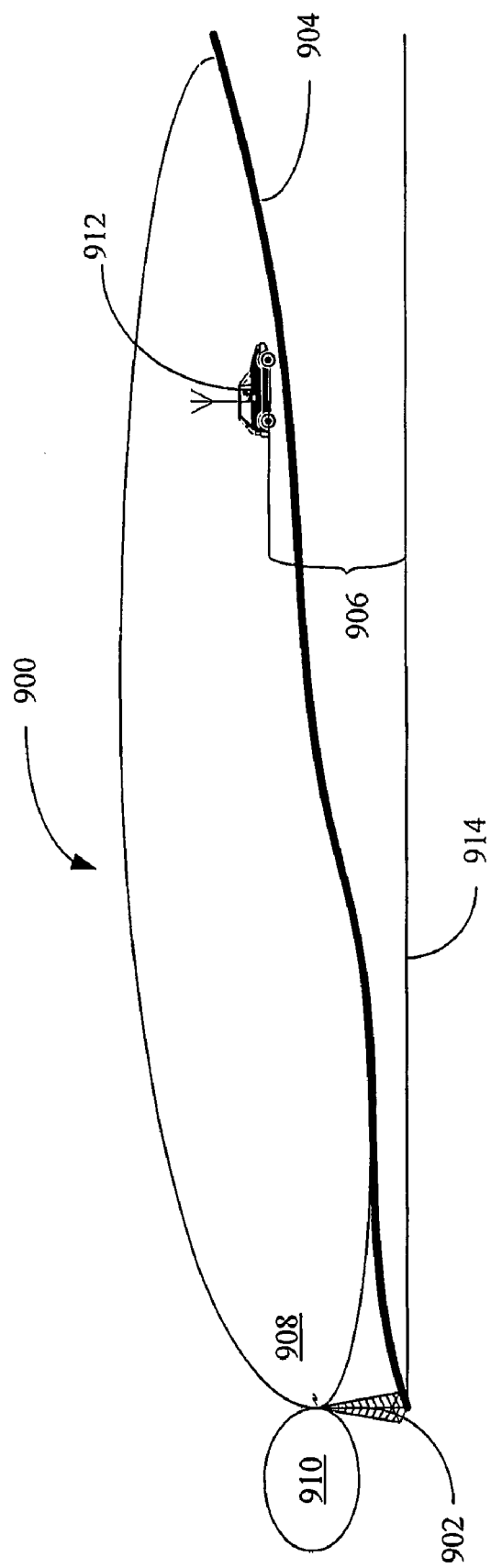
FIG. 9 is a graphical representation of an example cell site having a non-ideal circular footprint coverage pattern located along an example highway that is varying in altitude.

In FIG. 6. a graphical representation of an example cell site 600 having ideal circular footprint coverage pattern is shown. This type of pattern is typically achieved in open unobstructed areas. The cell site 600 has a basestation 602 located at either the center or centroid of the pattern and the cell site 600 may be divided into numerous cell site sectors such as 604, 606, 608, 610, 612, 614, 616 and 618. It is appreciated by those skilled in the art that in some cellular networks the cellular identification information may include data to the individual cell site sectors. As a result, a mobile unit 620 may be identified as being in cell site sector 612 within cell 600. Similarly. FIG. 7 is a graphical representation of an example cell site 700 With a basestation 702 having a non-ideal circular footprint coverage pattern located between a pair of obstructions 704 and 706. The obstructions 704 and 706 may be mountains, hills, buildings or other similar obstructions and the cell site 700 may be divided into numerous cell site sectors such as 708, 710, 712, 714, 716, 718, 720 and 722. Similar to FIG. 6, a mobile unit 724 may be identified as being in cell site sector 722 within cell 700. FIG. 8 is a graphical representation of an example cell site 800 with a basestation 802 having a non-ideal circular footprint coverage pattern located along an example highway 804. Because the pattern of cell site 800 is of a narrow pencil beam type, the cell site 800 may be divided into two sectors 806 and 808. Therefore, the location of mobile unit 810 may be identified as being in cell site sector 806 within cell site 800. Finally, FIG. 9 is a graphical representation of an example cell site 900 with a basestation 902 having a non-ideal circular footprint coverage pattern located along an example highway 904 that is varying in altitude 906. Again, because the pattern of cell site 900 is a narrow pencil beam type, the cell site 900 may be divided into two sectors 908 and 910. Therefore, the location of mobile unit 912 may be identified as being in cell site sector 908 within cell site 900 at an altitude 906 above a reference level 914.

It is appreciated by those skilled in the art that the boundaries of the cell sites shown in FIG. 1 and FIG. 6 through FIG. 9 are generally determined by where the handoff from one cell to another adjacent cell is defined. Additionally, the centroid of the cell site may be determined based on the boundaries defined by the handoff characteristics of the cells. A centroid determination of a cell site may be made utilizing two arbitrary orthogonal axes that cross the cell site area such the East-West ("E-W") axis and the North-South ("N-S") axis. An example procedure for determining the centroid may include drawing a E-W line through one of the fixes inside the cell site (generally chosen at random) and setting the location of the fix "zero" point for the linear coordinates along this E-W axis. All fixes received in the cell site from all mobile units may then be projected onto the E-W axis using a N-S projection. This will provide a linear coordinate along the E-W axis for every fix. A histogram may be created of all these linear coordinates of which the mode (or the mean) of the histogram is chosen along this axis. A N-S line may be drawn crossing the initial E-W axis at the linear coordinate of the mean or mode. The crossing point is the "zero" point of the linear coordinates on this second N-S axis. All fixes may then be projected inside the cell onto this new N-S axis. This will provide a linear coordinate along the N-S axis for every fix. A histogram of all these linear coordinates along the N-S line may be created and the mode (or the mean) along this axis may be determined. The centroid of the cell site would then be on the N-S axis at the linear coordinate corresponding to the mode (or the mean). It is appreciated that this example process makes no assumptions about the shape of the cell site, and takes into account that most of the calls from the mobile unit originate from inside the cell site. The process would be utilized in a recursive way (i.e., the database contains a normalized version of both histograms, and will be updated at every new fix) and it allows a progressive change in the location of the centroid if the usage pattern in the cell site evolves significantly.

In a similar way, altitude information may be extracted from multiple fixes, by computing the histogram of altitudes, determining the mode or mean as centroid (most probable altitude in this cell), and determining the maximum and minimum of all altitudes within this cell.

Figure 10:
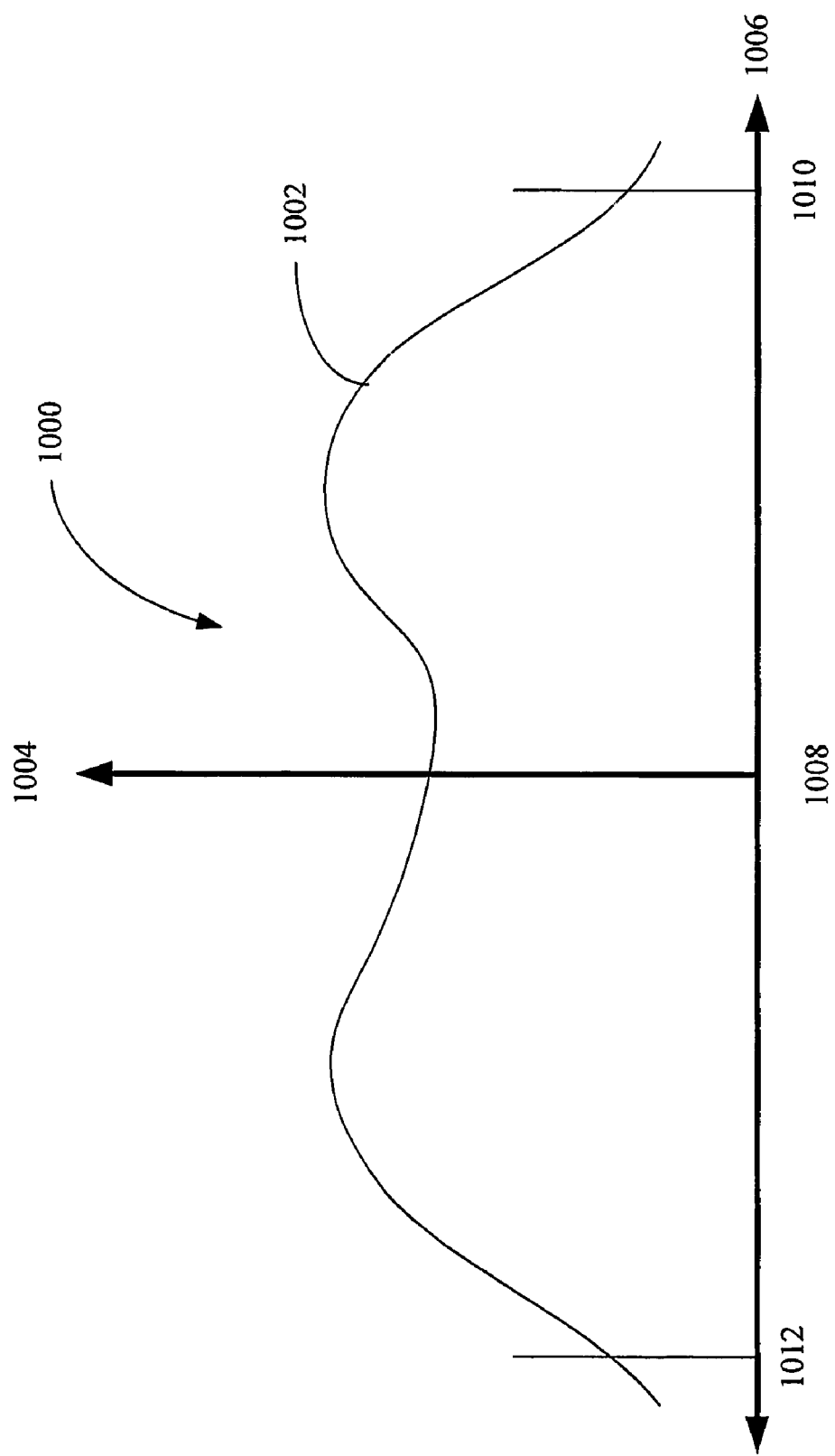
FIG. 10 is a graphical representation of the example variation of signal power as a function of radial distance from the centroid of an example cell site.

FIG. 10 is graphical representation of the example plot 1000 of a curve 1002 representing signal power 1002 as a function of radial distance 1004 from the centroid 1006 of an example cell site. The boundaries 1008 and 1010 are defined by the handoff characteristics of cell.

Figure 11:
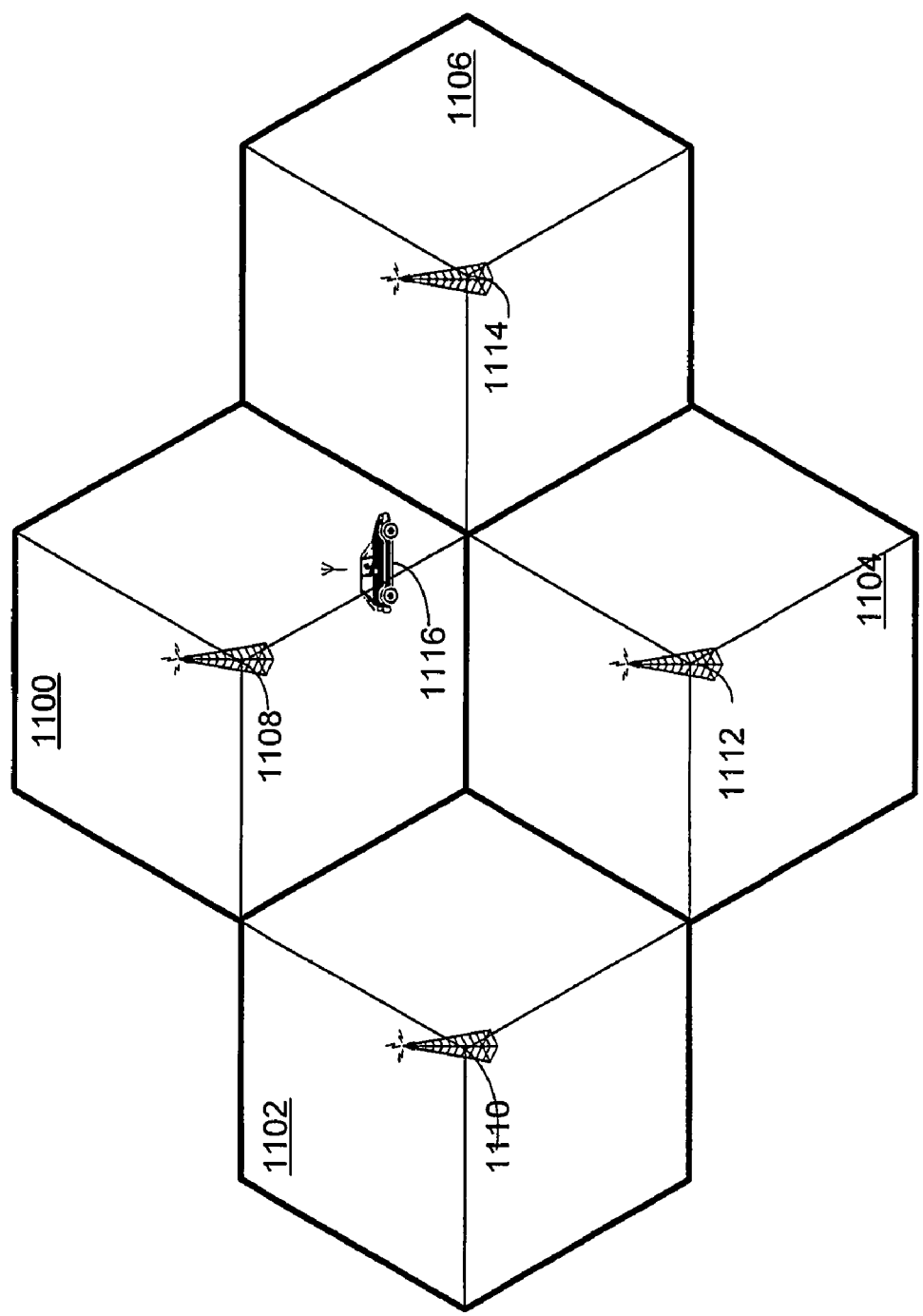
FIG. 11 is a graphical representation of four cell sites within a cluster of cells of a cellular telephone network communicating to an example wireless device.

It is appreciated with typical wireless devices such as cellular telephones, that while the wireless device is communicating with a particular basestation, it is also simultaneously listening to other basestations so as to enable functions like MAHO. As part of this operation, the wireless device is listening to other basestations and mapping their respective signal channel metrics (i.e., characteristics information of the cell or cells) such as signal level ("RSSI" or equivalent), bit error rate ("BER"), S/I+N, propagation delay and multi-path. As an example, FIG. 11 illustrates a graphical representation of four cell sites 1100, 1102, 1104 and 1106 with respective basestations 1108, 1110, 1112 and 1114 within a cluster of cells of a cellular telephone network communicating to mobile unit 1116.

The mobile unit 1116 is capable of tagging the measured characteristic information to the cellular identification and positional information and transmitting it to the central office in signal communication with the basestation the mobile unit 1116 is communicating to. This information is stored in a database at cellular network server. The location of mobile unit 1116 may then be derived from any of the modes defined in U.S. Pat. No. 6,389,291, titled "Multi-mode Global Positioning System For Use With Wireless Networks," issued to Ashutosh Pande et al. on May 14, 2002, and U.S. Pat. No. 6,427,120, titled "Information Transfer In A Multi-Mode Global Positioning System Used Wit Wireless Networks," issued to Lionel Jacques Gain et al. on Jul. 30, 2002, both of which are herein incorporated by reference.

When the location of the mobile unit 1116 cannot be derived from these methods, the mobile unit 1116 sends a message, or messages, that includes some form of cellular identification with signal level or BER. This would allow the central office to tap the database and derive an approximate position of the mobile unit 1116 even in areas where SPS signals cannot be received but cellular signal are available from basestations such as in deep urban environments.

In the case of utilizing propagation delay as characteristic information of the cell, when the mobile unit 1116 is communicating with a particular basestation, the mobile unit 1116 is continuously compensating for the propagation delay between the mobile unit 1116 and the basestation and then to the cellular network server. As part of this compensation operation the mobile unit 1116 is observing the round trip delay between a network entity (ex: location server) and mobile unit 1116, As a result, the mobile unit 1116 is capable of tagging the round trip delay to the cellular identification information of one or all the cell sites within listening range of the mobile unit 1116. This information is tagged with the location of the mobile unit 1116 and stored in a database to the cellular network server. The location of mobile unit 1116 may be derived from any of the modes defined in U.S. Pat. No. 6,389,291 and U.S. Pat. No. 6,427,120 B1. When time is not available at the SPS receiver and only coarse time may be sent from a sewer to reduce the uncertainty window so as to acquire a SPS signal as defined in U.S. Pat. No. 6,389,291 and U.S. Pat. No. 6,427,120 B1, based on the approximate location of the mobile unit 1116, a correction for the time delay may be made so as to increase the accuracy of the time observed at the mobile unit 1116. This may be achieved for example by employing some techniques such as a SNTP server, which in next generation mobile telephones may reside in the mobile telephone (due to always ON, IP nature of the next generation mobile networks). This will be helpful in improving the accuracy of time aiding in asynchronous wireless networks.

In the case of utilizing multi-pat information as characteristic information of the cell, while the mobile unit 1116 is communicating with a particular basestation, the mobile unit 1116 is detecting and correcting for multi-path on a dynamic basis. As part of this operation the mobile unit 1116 is listening to other basestations and utilizing a technology such as a RAKE receiver that identifies multi-path in the received signal. The multi-path information is then combined with the cellular identification information of one or all the cell sites within listening range of the mobile unit 1116. This information is tagged with the location of the mobile unit 1116 and stored in the database of the cellular network server. The location of mobile may be derived from any of the modes defined in U.S. Pat. No. 6,389,291 and U.S. Pat. No. 6,427, 120 B1. When location of mobile unit 1116 is derived from methods defined in U.S. Pat. No. 6,389,291 and U.S. Pat. No. 6,427,120 B1, information on multi-path may help identify the environment where the mobile unit 1116 is operating (i.e., open sky, rural, sub-urban, urban, deep urban canyon etc.). This may help identify messages containing some form of information on Multi-path with BER and will allow central office to tap the database and derive approximate position of the mobile unit 1116. This will be helpful in providing location in areas where SPS signals cannot be received but cellular signals are available from multiple basestations such as deep urban environments.

The process in FIG. 4 may be performed by hardware or software. If the process is performed by software, the software may reside in software memory (not shown) in the mobile unit or cellular network server. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document a "computer-readable medium," and/or "signal-bearing medium" is any means that may contain, store, communicate, propagate, or transport the program for use by or in connection with the instruction execution system, apparatus, or device. The computer-readable medium may selectively be, for example but not limited to, an electronic, magnetic, optical, electromagnetic, infrared, or semiconductor system, apparatus, and device, More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical); and a portable compact disc read-only memory "CDROM" "DVD"(optical).

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for determining the approximate position of a wireless device, located within a cell of a cellular telephone network, utilizing a satellite position system, the method comprising:
   transmitting to the wireless device a cellular identification of the cell;
   receiving characteristic information of the cell from the wireless device, the characteristic information being distinct from the cellular identification of the cell, the characteristic information being determined by the wireless device in response to receipt of a signal such that the wireless device measures the signal and determines the characteristic information of the cell;
   obtaining positional assistance information from a database when a location of the wireless device has not been derived, the positional assistance information corresponding to the received characteristic information and based at least partially on position data calculated from satellite position system processing; and
   transmitting the positional assistance information to the wireless device.

2. The method of claim 1, further including:
   receiving assisted positional information from the wireless device; and
   updating the positional assistance information of the database corresponding to the received assisted positional information of the wireless device.

3. The method of claim 2, wherein the characteristic information includes the bit error rate.

4. The method of claim 2, wherein the characteristic information includes the signal levels.

5. The method of claim 2, wherein the characteristic information includes the propagation delay.

6. The method of claim 2, wherein the characteristic information includes the multi-path correction information.

7. The method of claim 1, wherein the position data on which the positional assistance information is at least partially based is calculated from satellite position system processing previously performed by the wireless device.

8. The method of claim 1, wherein the position data on which the positional assistance information is at least partially based is calculated from satellite position system processing previously performed by one or more mobile units independent of the wireless device.

9. A method for determining the approximate position of a second wireless device, located within a cell of a cellular telephone network, utilizing a satellite position system, the method comprising:
   transmitting to the second wireless device a cellular identification of the cell;
   receiving positional information of a first wireless device and first characteristic information of the cell from the first wireless device the first characteristic information being distinct from the cellular identification of the cell the positional information including data calculated from satellite position system processing;
   creating a database of the positional information of the first wireless device and first characteristic information of the cell;
   receiving second characteristic information of the cell from the second wireless device the second characteristic information being distinct from the cellular identification of the cell;
   obtaining positional assistance information from the database, the positional assistance information corresponding to the received second characteristic information based on the first characteristic information; and
   transmitting the positional assistance information to the second wireless device.

10. The method of claim 9, further including:
    receiving assisted positional information from the second wireless device; and
    updating the positional assistance information of the database corresponding to the received assisted positional information from the second wireless device.

11. The method of claim 10, wherein the characteristic information includes the bit error rate.

12. The method of claim 10, wherein the characteristic information includes the signal levels.

13. The method of claim 10, wherein the characteristic information includes the propagation delay.

14. The method of claim 10, wherein the characteristic information includes the multi-path correction information.

15. A method for determining the approximate position of a wireless device, located within a cell of a cellular telephone network, utilizing a satellite position system, the method comprising:
    receiving a broadcast signal from a basestation, the broadcast signal including cellular identification of the cell;
    transmitting to the basestation characteristic information of the cell the characteristic information being distinct from the cellular identification of the cell, the characteristic information being determined by the wireless device in response to receipt and measurement of the broadcast signal;

receiving from the basestation positional assistance information;

determining assisted positional information utilizing the satellite position system and the positional assistance information, when a location of the wireless device has not been derived; and transmitting the assisted positional information to the basestation.

16. The method of claim 15, wherein the positional assistance information is obtained from a database.

17. The method of claim 16, further including updating the positional assistance information of the database corresponding to the transmitted assisted positional. information.

18. The method of claim 17, wherein the characteristic information includes the bit error rate.

19. The method of claim 17, wherein the characteristic information includes the signal levels.

20. The method of claim 17, wherein the characteristic information includes the propagation delay.

21. The method of claim 17, wherein the characteristic information includes the multi-path correction information.

22. The method of claim 15, wherein the positional assistance information received from the basestation is based at least partially on position data calculated from satellite position system processing previously performed by the wireless device.

23. The method of claim 15, wherein the positional assistance information received from the basestation is based at least partially on position data calculated from satellite position system processing previously performed by one or more mobile units independent of the wireless device.

24. A method for determining the approximate position of a wireless device, located within a cell of a cellular telephone network, utilizing a satellite position system, the method comprising:

transmitting a broadcast signal from a basestation to the wireless device, the broadcast signal including cellular identification of the cell;

receiving characteristic information of the cell from the wireless device, the characteristic information being distinct from the cellular identification of the cell, the characteristic information being determined by the wireless device in response to receipt and measurement of the broadest signal;

obtaining positional assistance information from a database, the positional assistance information corresponding to the received characteristic information;

transmitting the positional assistance information to the wireless device;

determining at the wireless device assisted positional information utilizing the satellite position system and the positional assistance information, when a location of the wireless device has not been derived; and transmitting the assisted positional information to the basestation.

25. The method of claim 24, further including:

receiving the assisted positional information from the wireless device at the basestation; and updating the positional assistance information of the database corresponding to the received assisted positional information of the wireless device.

26. The method of claim 25, wherein the characteristic information includes the bit error rate.

27. The method of claim 25, wherein the characteristic information includes the signal levels.

28. The method of claim 25, wherein the characteristic information includes the propagation delay.

29. The method of claim 25, wherein the characteristic information includes the multi-path correction information.

30. The method of claim 24, wherein the positional assistance information obtained from the database is based at least partially on position data calculated from satellite position system processing previously performed by the wireless device.

31. The method of claim 24, wherein the positional assistance information obtained from the database is based at least partially on position data calculated from satellite position system processing previously performed by one or more mobile units independent of the wireless device.

32. A system for determining the approximate position of a wireless device, located within a cell of a cellular telephone network, utilizing a satellite position system, the system comprising:

a basestation located within the cell, the basestation transmitting a broadcast signal to the wireless device;

a cellular measurement unit located in the wireless device, the cellular measurement unit capable of measuring characteristic information of the cell the characteristic information being distinct from cellular identification of the cell, the characteristic information being determined by the wireless device in response to receipt and measurement of the broadcast signal;

a database containing positional assistance information corresponding to the characteristic information;

a processing unit in signal communication with the basestation and the database, the processing unit capable of obtaining position assistance information from the database in response to the basestation receiving the characteristic information from the wireless device, when a location of the wireless device has not been derived; and a positional determination unit in the wireless device, the positional determination unit capable of determining the position of the wireless device based on the utilization of the satellite position system and the positional assistance information.

33. The system of claim 32, wherein the positional assistance information contained in the database is based at least partially on position data calculated from satellite position system processing previously performed by the wireless device.

34. The system of claim 32, wherein the positional assistance information contained in the database is based at least partially on position data calculated from satellite position system processing previously performed by one or more mobile units independent of the wireless device.

35. A system for determining the approximate position of a wireless device, located within a cell of a cellular telephone network, utilizing a satellite position system, the system comprising:

means for transmitting a broadcast signal from a basestation to the wireless device, the broadcast signal including cellular identification of the cell;

means for receiving characteristic information of the cell from the wireless device the characteristic information being distinct from the cellular identification of the cell, the characteristic information being determined by the wireless device in response to receipt and measurement of the broadcast signal;

means for obtaining positional assistance information from a database when a location of the wireless device has not been derived, the positional assistance information corresponding to the received characteristic information;

means for transmitting the positional assistance information to the wireless device;

means for determining at the wireless device assisted positional information utilizing the satellite position system and the positional assistance information; and means for transmitting the assisted positional information to the basestation.

36. The system of claim 35, wherein the positional assistance information obtained from the database is based at least partially on position data calculated from satellite position system processing previously performed by the wireless device.

37. The system of claim 35, wherein the positional assistance information obtained from the database is based at least partially on position data calculated from satellite position system processing previously performed by one or more mobile units independent of the wireless device.

38. A computer readable medium having software for determining the approximate position of a wireless device, located within a cell of a cellular telephone network, utilizing a satellite position system, the computer readable medium comprising:

logic configured for transmitting to the wireless device a cellular identification of the cell;

logic configured for receiving characteristic information of the cell from the wireless device the characteristic information being distinct from the cellular identification of the cell, the characteristic information being determined in response to receipt and measurement of a broadcast signal;

logic configured for obtaining positional assistance information from a database when a location of the wireless device has not been derived, the positional assistance information corresponding to the received characteristic information and based at least partially on position data calculated from satellite position system processing; and logic configured for transmitting the positional assistance information to the wireless device.

39. The computer readable medium of claim 38, further including:

logic configured for receiving assisted positional information from the wireless device; and logic configured for updating the positional assistance information of the database corresponding to the received assisted positional information of the wireless device.

40. The computer readable medium of claim 39, wherein the characteristic information includes the bit error rate.

41. The computer readable medium of claim 39, wherein the characteristic information includes the signal levels.

42. The computer readable medium of claim 39, wherein the characteristic information includes the propagation delay.

43. The computer readable medium of claim 39, wherein the characteristic information includes the multi-path correction information.

44. The computer readable medium of claim 38, wherein the positional assistance information obtained from the database is based at least partially on position data calculated from satellite position system processing previously performed by the wireless device.

45. The computer readable medium of claim 38, wherein the positional assistance information obtained from the database is based at least partially on position data calculated from satellite position system processing previously performed by one or more mobile units independent of the wireless device.

* * * * *